United States Patent [19]

Dunham, Jr.

[11] 4,367,210
[45] Jan. 4, 1983

[54] PIPELINE REACTION APPARATUS AND METHOD

[75] Inventor: Willard W. Dunham, Jr., Westfield, N.J.

[73] Assignee: Amax Magnesium Corporation, Parsippany, N.J.

[21] Appl. No.: 36,533

[22] Filed: May 7, 1979

[51] Int. Cl.³ .......................................... C01F 11/28
[52] U.S. Cl. .................................. 423/497; 423/659
[58] Field of Search ............... 423/659, 497, 485, 482, 423/162, 163, 173, 178, 481; 422/188, 189

[56] References Cited

U.S. PATENT DOCUMENTS

| | | | |
|---|---|---|---|
| 1,150,415 | 8/1915 | Bishop | 423/485 |
| 1,868,946 | 7/1932 | Low | 423/482 |
| 2,857,244 | 10/1958 | Graves | 423/497 |

Primary Examiner—Earl C. Thomas
Attorney, Agent, or Firm—Roland T. Bryan

[57] ABSTRACT

Calcium chloride is produced in a pipeline reactor vessel through reaction of a slurry of calcium carbonate-containing material and hydrochloric acid. Foaming is minimized through use of the reactor vessel of the invention.

6 Claims, 2 Drawing Figures

PIPELINE REACTION APPARATUS AND METHOD

The invention generally pertains to a reaction apparatus useful for performing processes that involve liquid/solid reactants that produce at least one gaseous product. Reactions of this nature are often significantly impeded by the formation of voluminous quantites of foam created in connection with the generation of the gaseous component of the products. Moreover, such reactions may even be terminated when excessive foaming renders control equipment inoperable or blocks entering or exiting process streams. This invention is directed toward a technique for minimizing such foaming problems and is particularly useful in the performance of processes in which calcium carbonate containing substances are reacted with hydrochloric acid to produce calcium chloride, water, and carbon dioxide.

Calcium chloride production through reaction of calcium carbonate and hydrochloric acid is generally known as shown in British Pat. No. 1,143,844; Canadian Pat. No. 447,489; French Pat. No. 1,426,207; and German Pat. No. 327,867. As will become more apparent later, none of the above mentioned patents appear to perform this reaction in the manner of the invention.

In accordance with this invention it has been determined that a pipeline type reactor is well suited to perform processes in which potentially foam-forming gaseous reaction products are generated. U.S. Pat. Nos. 86,289; 928,148; 1,288,400; 2,021,991; 2,525,276; 2,585,385; 2,815,391; 3,010,802; 3,111,394; 3,269,941; 3,549,351; 3,880,921; 3,923,262; 3,930,808; and 4,013,761 involve apparatus having tube-like or chamber-like members for treating or reacting various materials. As will become more apparent later, none of these patents is considered to disclose apparatus in accordance with the invention.

The method of the invention involves treating liquid and solid reactants to produce products of which at least one is in the gaseous state. The method is conducted by feeding liquid and solid reactants into an inclined elongated vessel at a rate that does not cause the cross-sectional area of the vessel to become filled with the reactants and reaction products. In other words, a free space is located above the surface of the flowing process stream. A reactant stream is caused to pass through the inclined vessel due to the influence of gravity. The reactants form at least one gaseous product which is contained within said vessel during passage through said vessel. Appreciable amounts of foaming do not occur during the process. The stream and gaseous product is then passed into a holding or digesting vessel at a location above the level of collected slurry of liquid and solid products, and the gaseous product is then withdrawn from the holding vessel under negative pressure. The collected slurry may comprise liquid and/or solid products as well as unreacted solid and/or liquid reactants.

Apparatus suitable for reacting liquid and solid reactants to produce at least one gaseous product in accordance with the invention includes an elongated tube-like reaction vessel having entry and exit ends. The vessel is inclined at an angle to the horizontal so as to facilitate gravity flow of liquid and solid reactants and products through the vessel.

Feed means are connected in substantially sealed relationship with the entry end of the reaction vessel for feeding liquid and solid reactants into the vessel. The feed means include means for regulating reactant input so that the reaction vessel does not become completely filled with liquid and solid reactants and products.

A digestion vessel is connected in substantially sealed relationship with the exit end of the reaction vessel for receiving liquid, solid, and gaseous reaction products and any unreacted reactants from the vessel. The digestion vessel includes vent means for removing gaseous products under a slightly negative pressure and also includes means for removing the liquid and solid products from the digestion vessel.

Figure 1:
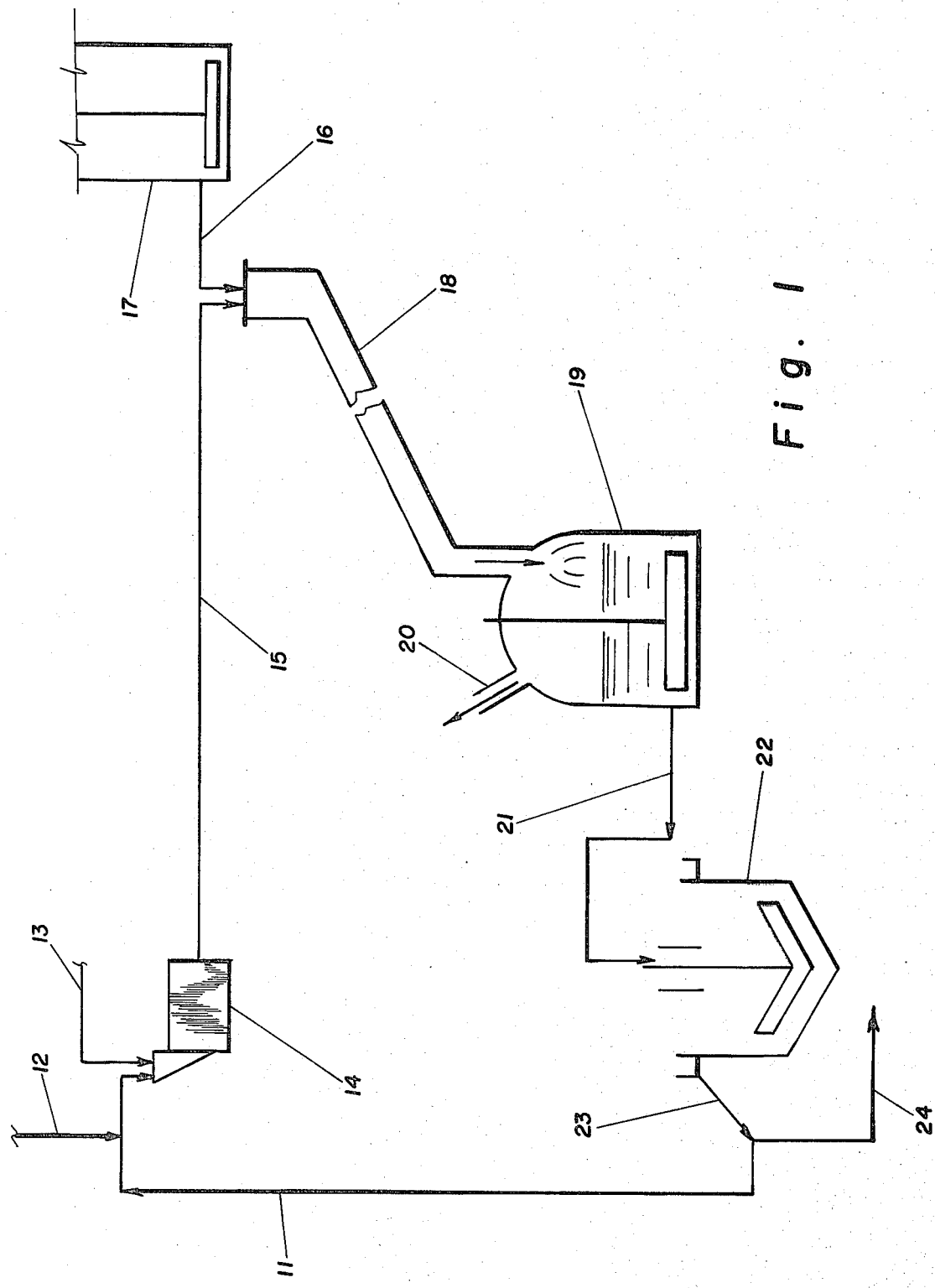
FIG. 1 is a schematic representation of a combination of equipment suitable to perform the process of the invention.

FIG. 1 schematically illustrates an embodiment for conducting the invention. Recycled calcium chloride, water, and calcium carbonate-containing materials such as oolitic sand are fed into ball mill 14 or the like from lines 11, 12, and 13 respectively to form a slurry which exits from the ball mill and passes through line 15 into pipeline reaction vessel 18. The addition of recycled calcium chloride is optional and is used when it is desired. The slurry, upon exit from the ball mill, typically has a solids content ranging from about 35% to 55% and a solid particle size of about 80 to 325 U.S. mesh with about 80% of the particles being less than 200 U.S. mesh. The respective limits for solids content are selected with a view toward maximizing the utilization of the solid reactant while, at the same time, obtaining sufficient viscosity for efficient material transfer from the milling device to the reaction vessel. Particle size limits are selected to optimize reactivity and to minimize milling energy input.

Hydrochloric acid is fed from holding tank 17 through line 16 into the pipeline reaction vessel. The strength of the acid typically ranges from about 10% to 20% by weight. The input of the slurry and hydrochloric acid is regulated in such a manner that the volume of reactants is not sufficient to fill the reaction vessel. Such restriction upon input assures that there will be sufficient space above the stream flowing through the reaction vessel to contain the $CO_2$ evolved during the reaction of $CaCO_3$ and $2HCl$ to be collected in the space and thereby preclude the accumulation of appreciable amounts of foam in the digestion vessel. Although the separation of $CO_2$ formed in the reaction vessel may generate slight amounts of foam at the surface of the process stream, such foam is dissipated during travel through the reaction vessel and during entry into the free space in the digester above the surface of the collected slurry. The feed rates may also be regulated to provide from about 30% to 100% in excess of the stoichiometric amount of calcium carbonate required to react with all of the hydrochloric acid added to the vessel. This procedure insures that an essentially complete reaction will occur.

Although the invention is described in terms of naturally occurring oolitic sands, such as those found proximate to the Great Salt Lake in Utah, other materials are contemplated. The above described oolitic sands typically contain 90% or more calcium carbonate. Other calcium-containing materials such as aragonites and other naturally occurring limestones may be processed in accordance with the invention. Other gaseous generating carbonates such as those of magnesium, potassium, or sodium may also be treated.

For reactions of this nature it is preferred to limit the reactant stream input to that which results a stream flow occupying no more than about an average of 65% of the cross-sectional area of the reactor. When a weir arrangement is employed in the invention, certain portions of the pipeline reaction vessel may locally exceed the average volume occupied by the stream. Typical residence times within the reactor range from about 40 to 80 seconds. The reactor vessel is normally inclined about 5° to 10° from the horizontal so as to achieve an adequate residence time for the reaction to be essentially completed. The pH of the reaction stream exiting from the reaction vessel typically ranges from about 3 to 5. The exit stream or slurry enters digestion vessel 19 where $CO_2$ is drawn off through vent 20 under negative pressure and the products of the reaction are drawn off through line 21 and enter clarifier 22. Typical residence times in the digester range from 15 to 60 minutes. Upon settling in the clarifier, a calcium chloride solution is drawn off through line 23 and all or a portion thereof may be recycled to ball mill 14 through line 11 or transported through line 24 for other use. A portion of the calcium chloride solution collected in the digester may be recycled to the milling apparatus and thereby serve as a milling medium. This is especially important when higher concentrations of calcium chloride are desired in the final product.

Figure 2:
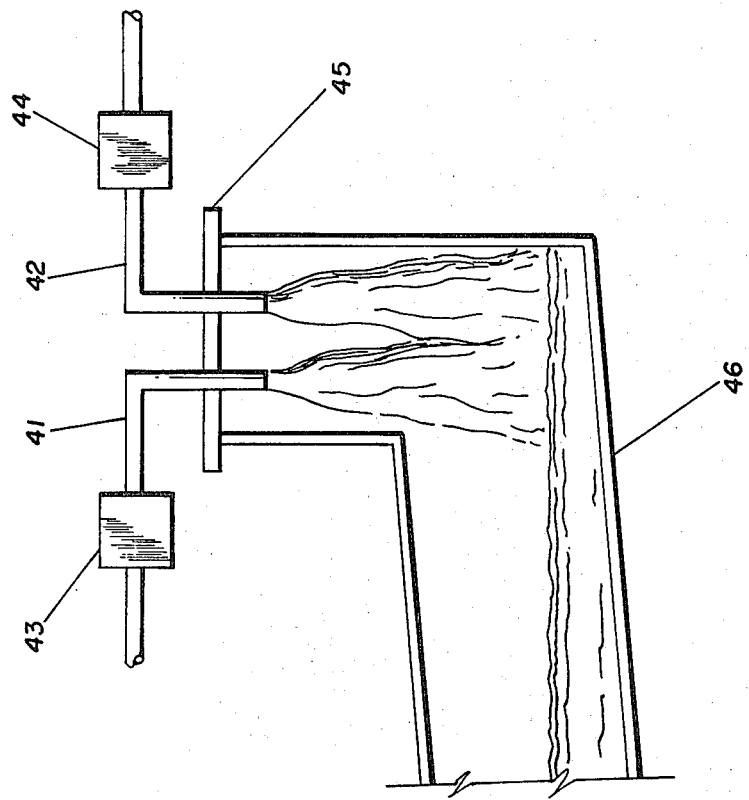
FIG. 2 is a horizontal cross-sectional view of the elongated reaction vessel of the invention along with certain related apparatus.
Figure 2:
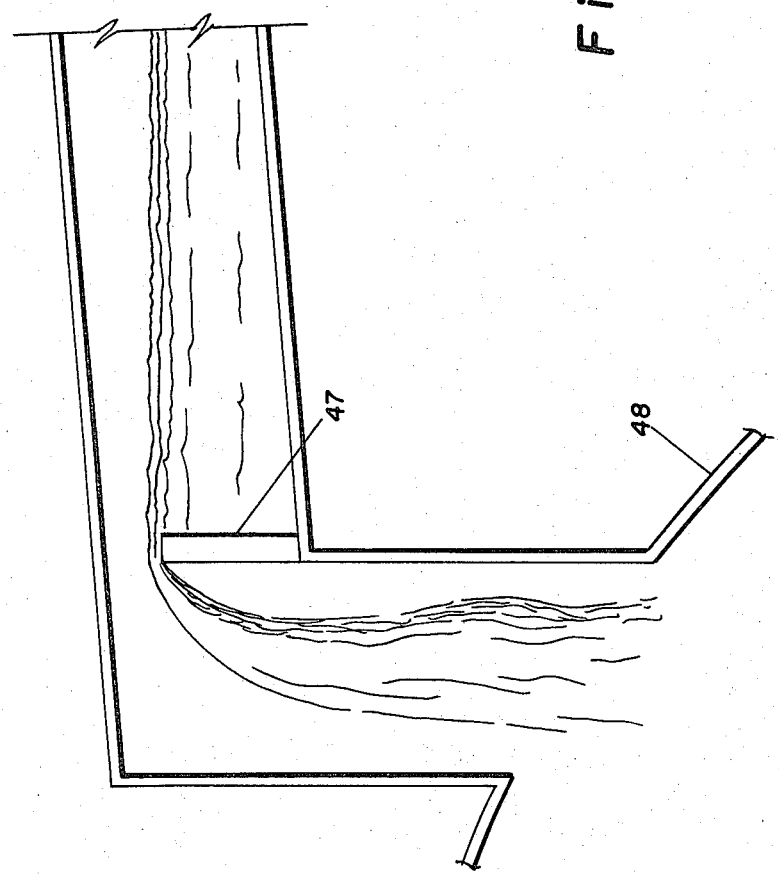

FIG. 2 is a horizontal cross-sectional view of the elongated reaction vessel of the invention along with certain other components of the system. Although the apparatus illustrated in FIG. 2 may be employed to conduct reactions other than that involving calcium carbonate slurries and hydrochloric acid to produce calcium chloride, such reaction will be used to facilitate the description of the apparatus. Input quantities of calcium carbonate slurry are regulated by regulator 43 and pass through line 41 into pipeline reaction vessel 46. Hydrochloric acid input rates are regulated by regulator 44 and pass through line 42 into reaction vessel 46. Sealing member 45 serves to substantially seal the entry end of reaction vessel 46 and thereby prevent the escape of $CO_2$ gases generated by the reaction of the feed materials. The reaction vessel may be constructed of any material suitable to contain the particular reagents of a given reaction. In the case of calcium chloride production, an acid resistant material such as fiberglass reinforced plastic pipe has proven to be suitable as temperatures created during the calcium chloride reaction do not involve those harmful to such material. Weir 47 or the like may optionally be used in the reaction vessel to impede the flow of the stream through the vessel and thereby increase residence time. The products of the reaction, $CaCl_2$, $H_2O$, and $CO_2$, pass from reaction vessel 46 into digester vessel 48 at a location near the top where the $CO_2$ is drawn off under negative pressure and the $CaCl_2$ and $H_2O$ are also drawn off following suitable residence time in this vessel. Unreacted components of the stream continue to react slowly in the digester without significant $CO_2$ evolution thus eliminating the foaming problem mentioned previously. Varied concentrations of calcium chloride solutions may be obtained, depending upon the strength of the acid and-/or the extent of calcium chloride recycling. Typically calcium chloride solution produced in the invention range from 15% to 25% by weight.

The following example demonstrates a specific embodiment of the invention. Apparatus similar to that shown in FIG. 2 with the exception of the Weir was used to react a slurry of milled oolitic sand and hydrochloric acid. A pipeline reaction vessel having one 90° bend near was constructed of polyvinyl chloride pipe having an inside diameter of 1¼ in. and a length of 20 ft. The digester had a volume of about 20 gallons. A milled oolite sand slurry containing 44% solids and having a particle size of 60 to 400 U.S. mesh with 84% of the particles less than 200 U.S. mesh was fed into the reactor at a rate of 750 ml/min. In addition a 16.6% concentration of hydrochloric acid was fed into the reactor at a rate of 980 ml/min. Following passage through the reactor the stream was passed through the digester at a rate which was controlled to maintain a 13 gallon level of the slurry in the digester. The flow rate resulted in an average residence time of about 30 minutes. A product containing 23% $CaCl_2$ and having a pH of 5.1 was obtained. Only slight foaming was observed in the digester. On the other hand, when the same components were added directly to the digester, thus bypassing the pipeline reactor vessel, copious quantities of foam were generated in the digester which eventually caused the reaction to be terminated prematurely.

What is claimed:

1. A method for treating aqueous liquid and solid reactants to produce at least one gaseous product, comprising:
    a. feeding said aqueous liquid and solid reactants into an inclined elongated reaction vessel at a rate that does not cause said vessel to become filled with said reactants;
    b. causing a stream of said reactants to pass through said reaction vessel due to the influence of gravity, said reactants reacting to form at least one gaseous product which is contained within said vessel during passage through said vessel and a slurry comprised of reactants and products; and
    c. further passing said slurry and gaseous product into a digestion vessel having free space located above slurry collected in said digestion vessel and withdrawing said gaseous product and collected slurry from said digestion vessel, said gaseous product not forming an appreciable amount of foam in said digestion vessel.

2. The method of claim 1, wherein:
    said reactants comprise a slurry of gas generating carbonate containing particles and a stream of hydrochloric acid and said products comprise a chloride, water, and carbon dioxide.

3. The method of claim 2, wherein:
    said gas generating carbonate containing particles comprise calcium carbonate and said chloride comprises calcium chloride.

4. The method of claim 3, wherein:
    said slurry has a solids content of about 35% to 55% and said calcium carbonate particles have a size of from about 80 to 325 U.S. mesh with about 80% of the particles having a size of less than about 200 U.S. mesh.

5. The method of claim 4, wherein:
    said slurry contains from about 30% to 100% in excess of the stoichiometric amount of calcium carbonate material required to react with all of said hydrochloric acid added to said vessel.

6. The method of claim 1, wherein:
    said reaction vessel is filled to no more than about 65% of its cross-sectional area with said reactants.

* * * * *